United States Patent Office 3,401,018
Patented Sept. 10, 1968

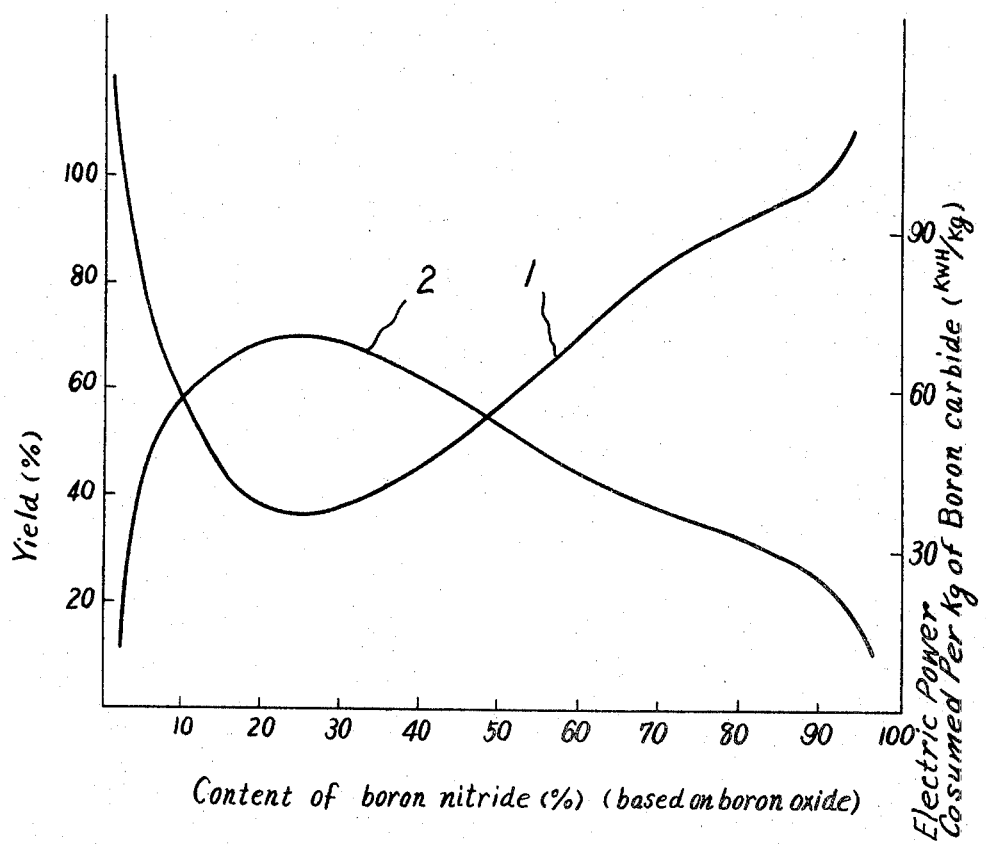

3,401,018
METHOD OF PRODUCING BORON CARBIDE
Hirokatsu Ogura, Ohta-ku, Tokyo, and Sadayuki Iwamoto, Totsuka-ku, Yokohama, Japan, assignors to Denki Kagaku Kogyo Kabushiki Kaisha, Tokyo, Japan
Filed Oct. 20, 1965, Ser. No. 498,772
Claims priority, application Japan, Apr. 15, 1965, 40/21,818
2 Claims. (Cl. 23—208)

ABSTRACT OF THE DISCLOSURE

A method for producing boron carbide comprising mixing boron oxide, carbon material and boron nitride in an amount of about 5% to about 90% by weight based on said boron oxide, heating and melting the mixture at a temperature from 500° to 1000° C., solidifying the melt mixture, grinding the solidified mixture and again heating the ground mixture at a temperature of more than about 2000° C. The boron nitride acts as a binder for the reaction mixture. Alternatively, the boron nitride can be produced by preliminary reacting boric acid, carbon material and a nitrogen compound having a decomposition temperature of more than about 200° C.

---

The present invention relates to a method of producing very efficiently boron carbide by heating a mixture or melted mixture comprising boron oxide and boron nitride or boric acid and boron nitride forming nitrogen compound to an increased temperature.

It has been well known that boron carbide has a high hardness and is useful as a polishing material. A method for producing boron carbide is known wherein boron oxide is mixed with carbon material and the mixture heated at a temperature more than 2000° C. in a carbon resistance furnace or an arc furnace etc. and subjected to a reduction and carbonization. The starting material, boron oxide, however, has a low melting point of about 600° C., so that the compound is melted before the reaction temperature is reached forming a viscose liquid layer which separates from the carbon material about the reaction zone having an increased temperature in the furnace, so that carbon monoxide generated in the reaction zone having an increased temperature in the furnace is difficult to discharge. Accordingly, a cavity is formed and heat efficiency is decreased. Therefore, the formation of boron carbide is not only retarded, but also portions of the boron carbide wherein physically harmful free carbon is present are increased. The yield of the product is correspondingly decreased, and the cost of boron carbide production is increased. Furthermore, problems such as extensive loss of volatile boron oxide by volatilization during the reaction period and an excess consumption of electric power arise and the handling of the product is aggravated.

The object of the invention is to provide a method of producing very efficiently boron carbide wherein by combining boron oxide with boron nitride or boric acid with a boron nitride forming nitrogen compound, a good condition of contact between boron oxide and carbon material is maintained during the entire reaction period and the formation of boron carbide proceeds smoothly. The reaction time is decreased and the difficulties produced by the production using boron oxide only as the starting material are overcome.

The function and effect of the addition of boron nitride which is an essential feature of the invention will be explained in more detail. When a mixture of boron oxide and carbon material added with boron nitride, is heated and melted, for example, in an arc furnace, boron nitride stable at an increased temperature is dispersed in the melted unreacted layer formed about the reaction zone having an increased temperature in the center of the furnace to form a highly gas permeable layer. Carbon monoxide generated by the reaction in the center of the furnace is discharged easily from the furnace and the formation of a viscose liquid layer formed by cohesion of boron oxide which is the main body of the melt is prevented. Accordingly, a good condition of contact between the materials is maintained and the arc is stable, so that the formation of boron carbide proceeds smoothly, and the total reaction period is decreased. Also, the volatilization loss of boron oxide and the scattering loss due to blow out of carbon monoxide is minimized and the production of boron carbide can be obtained without consumption of excess electric power.

A further advantage due to the addition of boron nitride consists in the easy removal of the product from the furnace on completion of the reaction after cooling. In other words, the boron nitride is converted into boron carbide at the reaction zone in the furnace, but in a comparatively low temperature portion of the reaction end. It remains as a stable solid powder and prevents the melted product from adhering and depositing on the unreacted materials or the wall of the furnace. After cooling, when the product lump is removed from the furnace, the lining of the furnace is not damaged and the product lump is completely separated from the unreacted products, thereby enhancing the handling of the product.

The addition of boron nitride not only serves effectively to maintain the starting mixture in a physically convenient state for the formation of boron carbide, but also boron nitride itself serves as the starting material for the production of boron carbide by heating to an increased temperature. The latter effect is very important together with the physical effect above described. The amount of boron nitride required to develop the effect is a desirably small amount. For example, when boron nitride of 5% by weight based on boron oxide used is added, 3 to 4 times the amount of boron carbide is formed than in the same process using the same amount of boron oxide only as the boron material.

Furthermore, according to the invention, it has been found that instead of the direct addition of boron nitride a mixture of boric acid and a nitrogenating agent is added wherein the amount of nitrogen compound as said nitrogenating agent is more than 5% by weight based on boric acid. The composition is preheated at a temperature below 1,000° C. and then heat treated at a temperature above 2,000° C. to obtain a satisfactory result.

Hereinafter, this aspect of the invention will be explained in detail.

Firstly, boric acid is composed with a nitrogenating agent and a given amount of carbon material and the composition is preheated in a closed vessel. Thereby the boric acid is partially reacted with the nitrogenating agent to form boron nitride and, simultaneously, the boric acid is dehydrated to form boron oxide. In this case, coexisting carbon material is covered with boric acid and protected with reducing gas generated by decomposition of the nitrogenating agent, so that there is susbtantially no loss.

The preferred amount of boron nitride added is determined by comparing the test results obtained by using boron oxide and carbon material as the starting material with the test results obtained by using boron nitride and carbon material as the starting materials performed prior to the invention. That is, when the amount of boron nitride added is less than 5% by weight based on boron oxide used, the melted reaction product has a high viscosity, the arc becomes unstable and the volatilization loss of boron oxide is considerably increased to obtain almost the same result as that in the case of using boron oxide and carbon material as the starting materials. Accordingly, the effect of addition can not be recognized and the product obtained becomes porous. Furthermore, when the amount of boron nitride is too large and is increased above the amount of boron oxide used, the reaction does not occur so easily since boron nitride is stable in a high temperature and under reducing atmosphere. The consumption of electrode increases and the amount of electric power consumed is also increased to obtain the same result as that of the case of using boron nitride and carbon material as the starting materials. Moreover, upon completion of the reaction a large amount of unreacted boron nitride remains on the bottom of the furnace and the effective reaction ratio of the total boron starting material is lowered.

For a better understanding of the invention, reference is made to the accompanying drawing.

The figure shows the found values of curve 1 of the amount of electric power consumed per 1 kg. of the product and curve 2 of the yield obtained by varying the amount of boron nitride added over 0 to 100% by weight based on boron oxide.

As seen from the figure in an amount of less than 5% by weight of boron nitride, the effect of addition of boron nitride can not be recognized and in an amount of more than 90% by weight, the consumption of electric power increases and the yield decreases. Accordingly, it has been found that the amount of boron nitride added based on boron oxide shows the most remarkable effect within the range of 5 to 90% by weight.

When using boron nitride and boron oxide as the starting materials for production of boron carbide, these materials are ground and mixed mechanically and used as such or in order to prevent the scattering, the mixed materials are melted and solidified by heating at a temperature above the melting point of boron oxide (577° C.) and then ground and used.

Furthermore, the amount of the nitrogenating agent added according to the invention is preferred to be 5 to 70% by weight based on boric acid to be mixed with carbon material. In an amount of less than 5% the effect of addition cannot be recognized and in an amount of more than 70% the formation of boron nitride during preheating does not increase proportionally and the nitrogenating agent does not act effectively, so that such a ratio is not preferable economically.

As the nitrogenating agent to be added, a nitrogen compound having a decomposition temperature of more than 200° C., such as dicyandiamide, melamine, ammonium chloride, etc. are effective. If the decomposition temperature is less than 200° C., in the preheating a high degree of volatilization occurs, so that such a substance is not preferable, but may be used.

In the case of preheating the mixed starting materials added with the nitrogenating agent, the heating temperature is less than 1,000° C., preferably, 700 to 800° C. If a temperature less than 500° is used, even where the heating is effected for a long time, boron nitride is not formed sufficiently. Rather the nitrogenating agent is decomposed and volatilized, thereby increasing the loss. Furthermore, even if heating at a high temperature more than 1,000° C., the reaction is not effective and the cost of heating becomes disadvantageously expensive. The heating time depends upon the amount of starting materials treated and the larger the amount, the longer the heating time. The heating is effected until on the completion of the preheating, the original weight of the starting materials decreases to about half. During the preheating, a lump of the starting materials is usually formed. Preferably, it is removed and ground and then heated.

The invention will be explained further by the following examples.

Example 1

| | Part by weight | Percent by weight |
| --- | --- | --- |
| Composition of materials | Boron oxide, 100 | 53.1 |
| | Boron nitride, 30 | 15.9 |
| | Oil coke, 58 | 31.0 |

A mixture of starting materials having the above composition ratio was heated and melted at 700 to 800° C. for 20 minutes, and then solidified and ground. The ground materials were charged with electric current for 30 minutes in an arc furnace to obtain fine boron carbide.

The yield was 68%, fixed carbon in the product 19.5%, nitrogen 0.1% and the amount of electric power consumed per 1 kg. of the product was 40 kwh.

Example 2

| | Part by weight | Percent by weight |
| --- | --- | --- |
| Composition of materials | Boron oxide, 100 | 47.1 |
| | Boron nitride, 50 | 23.6 |
| | Oil coke, 62 | 29.3 |

A mixture of materials having the above composition ratio was treated in the same manner as described in Example 1 to obtain fine boron carbide containing 21% of fixed carbon and 0.2% of nitrogen.

The yield was 53% and the amount of electric power consumed per 1 kg. of the product was 57 kwh.

Example 3

| | Part by weight | Percent by weight |
| --- | --- | --- |
| Composition of materials | Boron oxide, 100 | 39.4 |
| | Boron nitride, 90 | 35.4 |
| | Oil coke, 64 | 25.2 |

A mixture of materials having the above composition ratio was treated in the same manner as described in Example 1 to obtain boron carbide containing 20% of fixed carbon and 0.3% of nitrogen.

The yield was 25% and the amount of electric power consumed per 1 kg. of the product was 100 kwh.

Example 4

A mixture of powdery materials consisting of 1,490 g. of boric acid, 400 g. of carbon material and 422 g. of dicyandiamide was heated at 800° C. for 40 minutes to obtain a cohered product, which was cooled and then crushed, after which the crushed materials were heated to a high temperature for about 50 minutes in 10 kva. arc furnace. After cooling, the product was taken out from the furnace to obtain a single lump having fine metallic gloss of 260 g.

The yield was 78.5%, total carbon in the product 22.6%, total boron 76.5% and the amount of electric power consumed per 1 kg. of the product was 40 kwh.

Example 5

A mixture of powdery materials consisting of 1,490 g. of boric acid, 372 g. of carbon material and 432 g. of dicyandiamide was heated and melted in the same manner as described in Example 4 to obtain 240 g. of boron carbide.

The yield was 72.5%, total carbon in the product 21.7%, total boron 78% and the amount of electric power consumer per 1 kg. of the product was 42.6 kwh.

Example 6

A mixture of powdery materials consisting of 1,490 g. of boric acid, 372 g. of carbon material and 507 g. of dicyandiamide was treated in the same manner as described in Example 4 to obtain 230 g. of boron carbide.

The yield was 70%, total carbon in the product 21.5%, total boron 78% and the amount of electric power consumer per 1 kg. of the product was 45 kwh.

Example 7

A mixture of powdery materials consisting of 1,490 g. of boric acid, 408 g. of carbon material and 400 g. of dicyandiamide was treated in the same manner as described in Example 4 to obtain 255 g. of boron carbide.

The yield was 77%, total carbon in the product 22.0%, total boron 77.5% and the amount of electric power consumed per 1 kg. of the product was 38 kwh.

Example 8

A mixture of powdery materials consisting of 1,490 g. of boric acid, 396 g. of carbon material and 378 g. of dicyandiamide was heat-treated under the same condition as described in Example 4 to obtain 250 g. of boron carbide.

The yield was 75.5%, total carbon in the product 23%, total boron 76.5% and the amount of electric power consumed per 1 kg. of the product was 45 kwh.

Example 9

A mixture of powdery materials consisting of 1,490 g. of boric acid, 408 g. of carbon material and 535 g. of ammonium chloride was heat-treated under the same condition as described in Example 4 to obtain 240 g. of boron carbide.

The yield was 72.5%, total carbon in the product 20%, total boron 79% and the amount of electric power consumed per 1 kg. of the product was 47 kwh.

The product obtained by the method of the invention has less than almost 0.3% of nitrogen and the carbon content is near to theoretical value. It is a fine lump composed of an ashy black colour part having metal gloss and shows hardness of 2,800 to 2,900 at load 100 g. by a hardness measurement and also shows as polishing material an equivalent or more physical property than the commercially available product.

In the case of boric acid as the starting material, the cost is lower than when using boron oxide, the consumption of electric power is less and the yield is higher, so that such process is an effective method of producing boron carbide.

What we claim is:

1. A method of producing boron carbide from boron oxide and carbon material which comprises:
   (1) mixing boron oxide, carbon material and an amount in the range of from about 5% to about 90% by weight based on said boron oxide of boron nitride,
   (2) heating and melting the resulting mixture at a temperature in the range of from about 500° to about 1000° C.,
   (3) solidifying said melted mixture,
   (4) grinding said solidified mixture, and
   (5) heating said ground mixture at a temperature of more than about 2000° C. to form boron carbide.

2. A method of producing boron carbide which comprises:
   (1) mixing boric acid, carbon material and a nitrogen compound selected from the group consisting of dicyandiamide, melamine, and ammonium chloride, the amount of said nitrogen compound being on the order of from about 5% to about 70% by weight based on said boric acid,
   (2) heating and melting the resulting mixture at a temperature in the range of from about 500° C. to about 1000° C.,
   (3) solidifying said melted mixture,
   (4) grinding said solidified mixture, and
   (5) heating said ground mixture at a temperature of more than about 2000° C. to form boron carbide.

References Cited

UNITED STATES PATENTS

| | | | |
|---|---|---|---|
| 1,501,419 | 7/1924 | Podszus | 23—208 |
| 1,803,276 | 4/1931 | Walter. | |
| 2,137,144 | 11/1938 | Sainderichin | 23—208 |
| 2,163,293 | 6/1939 | Schroll et al. | 23—208 |
| 2,228,923 | 1/1941 | Kaufmann et al. | 23—208 |
| 2,285,837 | 6/1942 | Ridgway | 23—208 |
| 3,193,399 | 7/1965 | Washburn | 23—208 X |

OSCAR R. VERTIZ, *Primary Examiner.*

G. T. OZAKI, *Assistant Examiner.*